United States Patent
Tale et al.

(10) Patent No.: US 12,134,712 B2
(45) Date of Patent: Nov. 5, 2024

(54) TWO COMPONENT (2K) CURABLE COMPOSITION

(71) Applicant: Henkel AG & Co. KGaA, Duesseldorf (DE)

(72) Inventors: Nishant Tale, Pune (IN); Krunal Trivedi, Vapi (IN); Jayesh P. Shah, Pune (IN)

(73) Assignee: Henkel AG & Co. KGaA, Duesseldorf (DE)

( * ) Notice: Subject to any disclaimer, the term of this patent is extended or adjusted under 35 U.S.C. 154(b) by 206 days.

(21) Appl. No.: 17/747,770

(22) Filed: May 18, 2022

(65) Prior Publication Data
US 2022/0332990 A1   Oct. 20, 2022

Related U.S. Application Data

(63) Continuation of application No. PCT/EP2020/081093, filed on Nov. 5, 2020.

(30) Foreign Application Priority Data

Nov. 18, 2019   (IN) .............. 201941046830

(51) Int. Cl.
| | | |
|---|---|---|
| B32B 41/00 | (2006.01) | |
| C08K 3/10 | (2018.01) | |
| C08K 3/36 | (2006.01) | |
| C09J 7/10 | (2018.01) | |
| C09J 133/14 | (2006.01) | |
| C09J 167/06 | (2006.01) | |

(52) U.S. Cl.
CPC .............. C09J 133/14 (2013.01); C08K 3/10 (2013.01); C08K 3/36 (2013.01); C09J 7/10 (2018.01); C09J 167/06 (2013.01); *C09J 2301/408* (2020.08)

(58) Field of Classification Search
CPC . C09J 133/14; C09J 7/10; C09J 167/06; C09J 2301/408; C09J 4/06; C08K 3/10; C08F 283/01; C08F 4/34; C08F 220/46; C08F 222/32; C08G 63/553
USPC ................... 156/60, 64, 350, 351, 378, 379
See application file for complete search history.

(56) References Cited

U.S. PATENT DOCUMENTS

| | | |
|---|---|---|
| 3,855,040 A | 12/1974 | Malofsky |
| 4,731,146 A | 3/1988 | Clark |
| 4,906,317 A | 3/1990 | Liu |
| 4,990,281 A | 2/1991 | Clark |
| 5,312,864 A | 5/1994 | Engelskirchen et al. |
| 5,811,473 A | 9/1998 | Ramos et al. |
| 6,129,244 A | 10/2000 | Hoerth |
| 6,852,193 B2 | 2/2005 | Coughlan et al. |
| 8,313,006 B2 | 11/2012 | Willner et al. |
| 8,742,048 B2 | 6/2014 | Hersee et al. |
| 9,371,470 B2 | 6/2016 | Barnes et al. |
| 2012/0214940 A1* | 8/2012 | Hsu .......................... C08L 65/00 524/604 |
| 2014/0329959 A1* | 11/2014 | Barnes ....................... C09J 4/06 525/289 |
| 2017/0327616 A1 | 11/2017 | Ishizaki et al. |
| 2017/0369373 A1 | 12/2017 | Pfeil et al. |

FOREIGN PATENT DOCUMENTS

| | | |
|---|---|---|
| EP | 0520426 | 4/1996 |
| GB | 2502554 | 2/2016 |
| WO | 2013111036 A1 | 8/2013 |

OTHER PUBLICATIONS

PCT International Search Report issued in connection with International Application No. PCT/EP2020/081093—Mailing date: Feb. 19, 2021.
Peng Yongli et al., "A study on new adhesive for marble", vol. 25, No. 3, pp. 51-53, (2003).

* cited by examiner

*Primary Examiner* — Michael N Orlando
*Assistant Examiner* — Joshel Rivera
(74) *Attorney, Agent, or Firm* — Steven C. Bauman

(57) ABSTRACT

The present invention provides a two-component (2K) curable composition comprising:
(A) a first component comprising:
  i) at least one cyanoacrylate monomer represented by Formula 1:

$H_2C=C(CN)—COOR$   (1)

wherein: R is selected from $C_1$-$C_{18}$ alkyl, $C_3$-$C_{18}$ cycloalkyl, $C_2$-$C_{15}$ alkenyl, $C_6$-$C_{18}$ aryl, $C_7$-$C_{15}$ aralkyl and $C_3$-$C_{15}$ allyl; and,
  ii) peroxide catalyst; and,
  iii) at least one cure accelerator for said at least one cyanoacrylate monomer i);
(B) a second component comprising:
  i) at least one free radically curable compound; and,
  ii) at least one transition metal compound,
wherein, when said components are mixed together the peroxide catalyst initiates cure of said free radically curable compound(s) and the transition metal compound(s) initiates cure of the cyanoacrylate monomer(s), and
further wherein said at least one free radically curable compound comprises at least one unsaturated polyester polymer containing at least two cycloolefinic double bonds.

17 Claims, No Drawings

TWO COMPONENT (2K) CURABLE COMPOSITION

FIELD OF THE INVENTION

The present invention is directed to a two-component (2K) curable composition based on cyanoacrylate monomers.

More specifically, the present invention is directed to a two-component (2K) free-radically curable composition comprising, in a first component, at least one cyanoacrylate monomer and, in a, second component, at least one unsaturated polyester.

BACKGROUND OF THE INVENTION

In the assembly of structures using adhesives, it can be challenging to establish the right composition that will deliver both the required bond strength and fixture speed to facilitate production. While some adhesives provide strong structural bonds, they take hours to fixture and require that parts be stored until they attain suitable strength for handling. Conversely, compositions that offer the fastest cure may not bear loads or withstand thermal or mechanical stresses.

Curable cyanoacrylate compositions are well recognized for their ability to bond a wide range of substrates—including plastic, metal, elastomers and porous materials—and for their ability to develop bond strength over the order of minutes and, depending on the particular substrate, often over the order of seconds. The polymerization of cyanoacrylate monomers is initiated by nucleophilic species found under normal atmospheric conditions on most surfaces: the initiation by such surface chemistry means that sufficient initiating species tend to be available when two surfaces are in close contact with a small layer of cyanoacrylate disposed therebetween. And based on that initiation chemistry, cyanoacrylates can find utility in high-volume production environments.

Cyanoacrylate adhesive performance—in particular shear/peel strength, durability and toughness—is however oftentimes compromised when the adhesive is exposed to elevated temperatures, to elevated relative humidity or to polar solvents. In that latter case, the adhesives can experience blooming wherein a white haze settles along the bond line and creates aesthetic concerns. Perhaps more importantly, cyanoacrylates can be very brittle when fully cured and can possess low impact strength. As such, bonded joints formed from said adhesives are unable to bear heavy loads: this is obviously deleterious as, by definition, structural adhesives become part of the assembly and should not fail when the substrates that they bond are either impacted or stressed to their yield point.

To moderate the speed-versus-strength dilemma, certain authors have sought to formulate hybrid adhesive technologies which are designed to eliminate the limitations of instant adhesives and deliver a rapid structural bond which possesses the requisite shear/peel strength and durability.

US 2017335151 A (Ward et al.) discloses a two-part curable composition comprising: (a) a first part comprising a cyanoacrylate composition comprising: a cyanoacrylate component, and a rubber toughening agent comprised of (i) reaction products of the combination of ethylene, methyl acrylate and monomers having carboxylic acid cure sites, (ii) dipolymers of ethylene and methyl acrylate, and combinations of (i) and (ii); and, (b) a second part comprising: a 2-substituted benzothiazole or derivative thereof, wherein the 2-substitutent is a $C_{1-20}$ alkyl, a $C_{2-20}$ alkene, a $C_{8-20}$ alkylbenzyl, a $C_{1-20}$ alkylamino, a $C_{1-20}$ alkoxy, a $C_{1-20}$ alkylhydroxy, an ether, a sulfenamide, a $C_{1-20}$ thioalkyl or a $C_{1-20}$ thioalkoxy group; and, wherein at least one of the first or second part further comprises: a component containing at least two (meth)acrylate functional groups, at least one benzonitrile compound substituted with at least two or more electron withdrawing groups selected from halo, —$NO_2$ or —CN and combinations thereof, and at least one anhydride component.

US2017327616 A1 (Kenichi et al.) describes a two-part curable composition comprising: a first reagent containing at least a 2-cyanoacrylic acid ester; and, a second reagent containing at least a polymer having a hydrolyzable silyl group, in which an elastomer and a curing catalyst for the above polymer are each contained in at least one of the first and second reagents in predetermined amounts.

U.S. Pat. No. 8,742,048 (Hersee et al.) discloses a two-part curable composition comprising: (a) a first part comprising a cyanoacrylate component and a cationic catalyst; and, (b) a second part comprising a cationic curable component, wherein when mixed together the cationic catalyst initiates cure of the cationic curable component.

U.S. Pat. No. 9,371,470 (Barnes et al.) discloses a two-part curable composition comprising: (a) a first part comprising a cyanoacrylate component and a peroxide catalyst; and, (b) a second part comprising a free radical curable component and a transition metal, wherein when mixed together the peroxide catalyst initiates cure of the free radical curable component and the transition metal initiates cure of the cyanoacrylate component.

Notwithstanding the state of the art, it would be desirable to provide an adhesive system having both the features of an instant adhesive—such as fast fixture time and the ability to bond a wide range of substrates, such as metals and plastics observed with cyanoacrylates—together with improved bond strength over a wider Variety and/or selection of substrates. Taking into account practical considerations, it would also be desirable to provide a two part reactive adhesive with reduced odor and flammability that could be mixed at a 1:1 volume ratio without compromising shelf life stability or adhesive performance.

Statement of the Invention

In accordance with a first aspect of the present invention there is provided a two component (2K) composition comprising:
(A) a first component comprising:
  i) at least one cyanoacrylate monomer represented by Formula 1:

$$H_2C=C(CN)-COOR \qquad (1)$$ 

wherein: R is selected from $C_1$-$C_{18}$ alkyl, $C_3$-$C_{18}$ cycloalkyl, $C_2$-$C_{15}$ alkenyl, $C_6$-$C_{18}$ aryl, $C_7$-$C_{15}$ aralkyl and $C_3$-$C_{15}$ allyl;
  ii) peroxide catalyst; and,
  iii) at least one cure accelerator for said at least one cyanoacrylate monomer i);
(B) a second component comprising:
  i) at least one free radically curable compound; and,
  ii) at least one transition metal compound,
  wherein, when said components are mixed together, the peroxide catalyst initiates cure of said free radically curable compound(s) and the transition metal compound(s) initiates cure of the cyanoacrylate monomer(s), and further wherein said at least one free radically curable compound comprises at least one unsaturated polyester polymer containing at least two cycloolefinic double bonds.

Compositions in accordance with the present invention demonstrate, upon mixing of the two components, propitious cohesive strength and fixture times to a variety of substrates.

The two-component (2K) curable composition may preferably be characterized by comprising from 50 to 99.98 wt. %, for example from 90 to 99 wt. %, based on the weight of component (A), of i) said at least one cyanoacrylate monomer. Independently or additionally, said two component (2K) composition may preferably be characterized by comprising from 0.1 to 10 wt. %, for example from 0.1 to 5 wt. %, of ii) said peroxide catalyst, based on the total weight of the composition.

It is preferred that said cure accelerator for the at least one cyanoacrylate monomer i) is selected from the group consisting of: calixarenes; oxacalixarenes; silacrowns; crown ethers; cyclodextrins; poly(ethyleneglycol) di(meth)acrylates; ethoxylated hydric compounds; and, combinations thereof. Independently of or additional to that selection, the two-component (2K) curable composition may be characterized by comprising from 0.01 to 10 wt. % of iii) said at least one cure accelerator, based on the total weight of the composition.

In important embodiments of the present invention, component (B) is further characterized by the inclusion of a rheology modifier therein. In this regard, good results have been obtained where component (B) further comprises from 1 to 5 wt. %, based on the weight of the composition, of hydrophobic fumed silica.

It is preferred for the unsaturated polyester (UPS) of component (B) to be essentially free from styrene and be characterized by a weight average molecular weight (Mw) of from 1000 to 1000 daltons, for example from 2000 to 10000 daltons. Moreover, the unsaturated polyester (UPS) should preferably comprise $C_5$ to $C_8$ cyclic moieties, which moieties may be strained cyclic moieties. Independently of or additional to these structural preferences, it is preferred that the two-component (2K) curable composition be characterized by comprising from 40 to 95 wt. %, based on the weight of component (B), of i) said at least one unsaturated polyester polymer (UPS).

In an embodiment of the invention, the first component (A) is housed in a first chamber of a dual chamber cartridge and the second component (B) is housed in a second chamber of the dual chamber cartridge. The chambers may desirably be of equal volume.

In accordance with a second aspect of the present invention, there is provided a cured product obtained from the two-component (2K) composition as defined hereinabove and in the appended claims. The cured product demonstrates excellent strength initially and that strength is retained after heat aging.

The present invention also provides for the use of the cured reaction product as defined herein above and in the appended claims as a structural adhesive.

Definitions

As used herein, the singular forms "a", "an" and "the" include plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or method steps.

As used herein, the term "consisting of" excludes any element, ingredient, member or method step not specified.

When used herein, the term "consisting essentially of" limits the scope of a claim to the specified element, ingredient, member or method step and those supplementary elements, ingredients, members or methods steps which do not materially affect the basic and novel characteristic(s) of the claimed invention.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

Further, in accordance with standard understanding, a weight range represented as being "from 0" specifically includes 0 wt. %: the ingredient defined by said range may or may not be present in the composition.

The words "preferred", "preferably", "desirably" and "particularly" are used frequently herein to refer to embodiments of the disclosure that may afford particular benefits, under certain circumstances. However, the recitation of one or more preferable, preferred, desirable or particular embodiments does not imply that other embodiments are not useful and is not intended to exclude those other embodiments from the scope of the disclosure.

As used throughout this application, the word "may" is used in a permissive sense—that is meaning to have the potential to—rather than in the mandatory sense.

As used herein, room temperature is 23° C. plus or minus 2° C. As used herein, "ambient conditions" means the temperature and pressure of the surroundings in which the composition is located or in which a coating layer or the substrate of said coating layer is located.

"Two-component (2K) compositions" in the context of the present invention are understood to be compositions in which a first component (A) and a second component (B) must be stored in separate vessels because of their (high) reactivity. The two components are mixed only shortly before application and then react, typically without additional activation, with bond formation and thereby formation of a polymeric network. Herein higher temperatures may be applied in order to accelerate the cross-linking reaction(s).

As used herein, either alone or as part of another group, "$C_1$-$C_n$ alkyl" group refers to a monovalent group that contains 1 to n carbons atoms, that is a radical of an alkane and includes straight-chain and branched organic groups. As such, a "$C_1$-$C_{30}$ alkyl" group refers to a monovalent group that contains from 1 to 30 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; tert-butyl; n-pentyl; n-hexyl; n-heptyl; and, 2-ethylhexyl. In the present invention, such alkyl groups may be optionally interrupted. Independently or additionally, such alkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide, carbonyl, carboxyl and hydroxy. In general a preference for alkyl groups containing from 1-18 carbon atoms ($C_1$-$C_{18}$ alkyl)—for example alkyl groups containing from 1 to 12 carbon atoms ($C_1$-$C_{12}$ alkyl) or from 1 to 6 carbon atoms ($C_1$-$C_6$ alkyl)—should be noted.

As specific examples of substituted alkyl groups there may be mentioned "$C_1$-$C_{18}$ haloalkyl" groups by which is meant a $C_1$-$C_{18}$ alkyl group, as defined above, wherein at least one of the $C_1$-$C_{18}$ alkyl group's hydrogen atoms is replaced with an halogen atom.

The term "$C_3$-$C_{18}$ cycloalkyl" is understood to mean a saturated, mono-, bi- or tricyclic hydrocarbon group having from 3 to 18 carbon atoms. In general, a preference for cycloalkyl groups containing from 3-12 carbon atoms ($C_3$-$C_{12}$ cycloalkyl groups) should be noted. Examples of cycloalkyl groups include: cyclopropyl; cyclobutyl; cyclopentyl; cyclohexyl; cycloheptyl; cyclooctyl; adamantane; and, norbornane. In the present invention, such cycloalkyl groups may be optionally interrupted. Independently or additionally, such cycloalkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide, carbonyl, carboxyl and hydroxy.

As used herein, an "$C_6$-$C_{18}$ aryl" group used alone or as part of a larger moiety—as in "aralkyl group"—refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include: phenyl; indenyl; naphthalenyl, tetrahydronaphthyl, tetrahydroindenyl; tetrahydroanthracenyl; and, anthracenyl. And a preference for phenyl groups may be noted.

As used herein, "$C_2$-$C_{15}$ alkenyl" refers to hydrocarbyl groups having from 2 to 15 carbon atoms and at least one unit of ethylenic unsaturation. The alkenyl group can be straight chained, branched or cyclic and may optionally be substituted. The term "alkenyl" also encompasses radicals having "cis" and "trans" configurations, or alternatively, "E" and "Z" configurations, as appreciated by those of ordinary skill in the art. In general, however, a preference for unsubstituted alkenyl groups containing from 2 to 10 ($C_{2-10}$) or 2 to 8 ($C_{2-8}$) carbon atoms should be noted. Examples of said $C_2$-$C_{12}$ alkenyl groups include, but are not limited to: —CH=$CH_2$; —CH=$CHCH_3$; —$CH_2$CH=$CH_2$; —C(=$CH_2$)($CH_3$); —CH=$CHCH_2CH_3$; —$CH_2$CH=$CHCH_3$; —$CH_2CH_2$CH=$CH_2$; —CH=$C(CH_3)_2$; —$CH_2$C(=$CH_2$)($CH_3$); —C(=$CH_2$)$CH_2CH_3$; —C($CH_3$)=$CHCH_3$; —C($CH_3$)CH=$CH_2$; —CH=$CHCH_2CH_2CH_3$; —$CH_2$CH=$CHCH_2CH_3$; —$CH_2CH_2$CH=$CHCH_3$; —$CH_2CH_2CH_2$CH=$CH_2$; —C(=$CH_2$)$CH_2CH_2CH_3$; —C($CH_3$)=$CHCH_2CH_3$; —CH($CH_3$)CH=CHCH; —CH($CH_3$)$CH_2$CH=$CH_2$; —$CH_2$CH=$C(CH_3)_2$; 1-cyclopent-1-enyl; 1-cyclopent-2-enyl; 1-cyclopent-3-enyl; 1-cyclohex-1-enyl; 1-cyclohex-2-enyl; and, 1-cyclohexyl-3-enyl. In the present invention, such alkenyl groups may be optionally interrupted. Independently or additionally, such alkenyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide, carbonyl, carboxyl and hydroxy.

As used herein, "$C_3$-$C_{15}$ allyl" refers to a —CHR—CR'=CR"R''' group having from 3 to 15 carbon atoms, wherein R, R', R", and R''' are independently selected from H and $C_1$-$C_4$ alkyl, subject to the condition that said group comprises at least one allylic hydrogen.

The term "$C_2$-$C_{12}$ alkynyl" as used herein refers to an unsaturated straight or branched hydrocarbon having from 2 to 12 carbon atoms and at least one carbon-carbon triple bond. The alkynyl group can be straight chained or branched and may optionally be substituted. Exemplary alkynyl groups include ethynyl, prop-1-yn-1-yl, and but-1-yn-1-yl. In the present invention, such alkynyl groups may be optionally interrupted. Independently or additionally, such alkenyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide, carbonyl, carboxyl and hydroxy.

As used herein, "alkylaryl" refers to alkyl-substituted aryl groups and "substituted alkylaryl" refers to alkylaryl groups further bearing one or more substituents as set forth above.

The term "hetero" as used herein refers to groups or moieties containing one or more heteroatoms, such as N, O, Si and S. Thus, for example "heterocyclic" refers to cyclic groups having, for example, N, O, Si or S as part of the ring structure. "Heteroalkyl" and "heterocycloalkyl" moieties are alkyl and cycloalkyl groups as defined hereinabove, respectively, containing N, O, Si or S as part of their structure.

The phrase "optionally interrupted" as used herein refers to a group, as defined above, which is either uninterrupted or which is interrupted between adjacent carbon atoms by: oxygen (O); sulphur (S); or, the heterogroup N(R") wherein R" is H, $C_1$-$C_6$ alkyl or $C_6$-$C_{18}$ aryl. For instance, as regards Formula 1 herein above, R may be a $C_1$-$C_{18}$ alkyl group or $C_1$-$C_{12}$ alkyl group interrupted by one oxygen (O) atom.

The term "cyclic" refers to alicyclic or aromatic substituents that may or may not be substituted and/or heteroatom containing, and that may be monocyclic, bicyclic, or polycyclic.

As used herein, "(meth)acrylate" and like terms are intended to include both acrylate and methacrylate.

The term "cure accelerator" is intended herein to encompass any material which is a cure accelerator (or curing agent) for the stated compounds. The accelerator may be of either the catalytic or reactive type.

The term "crown ether" as used herein means a macrocyclic polyether whose structure exhibits a conformation with a so-called hole capable of trapping cations by coordination with a lone pair of electrons on the oxygen atoms (McGraw-Hill *Dictionary of Scientific and Technical Terms* (3rd Edition 1984)). Crown ethers are a species of macrocyclic ligand.

As used herein, the term "silica" refers to amorphous silicon dioxide ($SiO_2$). As used herein, the term "fumed silica" is synonymous with "pyrogenic silica" and refers to silicon dioxide formed in flame or in sufficiently high temperature to decompose organic materials.

The term "hydrophobic silica" means any silica whose surface is treated with silylating agents—for example halogenated silanes such as alkylchlorosilanes, siloxanes such as dimethylsiloxanes or silazanes—so as to functionalize the —OH groups with silyl (Si—Rn) groups.

The molecular weights referred to in this specification can be measured with gel permeation chromatography (GPC) using polystyrene calibration standards, such as is done according to ASTM 3536.

The "acid value" or "acid number" is a measure of the amount of free acid present in a compound: the acid value is the number of milligrams of potassium hydroxide required for the neutralization of free acid present in one gram of a substance (mg KOH/g). Any measured acid values given herein have been determined in accordance with German Standard DIN 53402.

Unless otherwise stated, OH values given herein were obtained following *Deutsche (DGF) Einheitsmethoden zur Untersuchung von Fetten, Fettprodukten, Tensiden and verwandten Stoffen* (Gesamtinhaltsverzeichnis 2016) C-V 17b (53).

Viscosities of the coating compositions described herein are, unless otherwise stipulated, measured using the Brookfield Viscometer, Model RVT at standard conditions of 20° C. and 50% Relative Humidity (RH). The viscometer is calibrated using silicone oils of known viscosities, which vary from 5,000 cps to 50,000 cps. A set of RV spindles that attach to the viscometer are used for the calibration. Measurements of the coating compositions are done using the No. 6 spindle at a speed of 20 revolutions per minute for 1 minute until the viscometer equilibrates. The viscosity corresponding to the equilibrium reading is then calculated using the calibration.

The term "essentially free of" should be interpreted analogously as meaning the relevant composition comprises less than 0.25% by weight of the stated compound or element.

DETAILED DESCRIPTION OF THE INVENTION

Component A
i) Cyanoacrylate Monomer

The cyanoacrylate component includes i) at least one cyanoacrylate monomer represented by Formula 1:

$$H_2C=C(CN)-COOR \qquad (1)$$

wherein: R is selected from $C_1$-$C_{18}$ alkyl, $C_3$-$C_{18}$ cycloalkyl, $C_2$-$C_{15}$ alkenyl, $C_6$-$C_{18}$ aryl, $C_7$-$C_{15}$ aralkyl and $C_3$-$C_{15}$ allyl.

Preferably R in Formula 1 is selected from $C_1$-$C_{12}$ alkyl, $C_3$-$C_{12}$ cycloalkyl and $C_3$-$C_{12}$ allyl. As preferred monomers in accordance with Formula 1—which may be used alone or in combination—there may be mentioned: methyl cyanoacrylate; ethyl-2-cyanoacrylate (ECA); n-propyl-2-cyanoacrylate; i-propyl-2-cyanoacrylate; n-butyl-2-cyanoacrylate; t-butyl-2-cyanoacrylate; octyl cyanoacrylates; and, 3-methoxyethyl cyanoacrylate.

The composition should comprise from 50 to 99.98 wt. %, for example from 90 to 99 wt. %, based on the weight of component (A) of i) said at least one cyanoacrylate monomer. In an alternative but not mutually exclusive expression of preference, said composition should comprise from 25 to 50 wt. %, based on the weight of the composition, of i) said at least one cyanoacrylate monomer.

ii) Peroxide Catalyst

The composition of the present invention includes ii) at least one peroxide catalyst. The composition should conventionally comprise from 0.1 to 10 wt. %, for example from 0.1 to 5 wt. %, of ii) said at least one peroxide catalyst, based on the total weight of the composition.

While certain peroxides—such as dialkyl peroxides—have been disclosed as useful catalysts in inter alia U.S. Pat. No. 3,419,512 (Lees) and U.S. Pat. No. 3,479,246 (Stapleton) and indeed may have utility herein, hydroperoxides represent a preferred class of catalyst for the present invention. Further, whilst hydrogen peroxide itself may be used, the most desirable catalysts are the organic hydroperoxides. For completeness, included within the definition of hydroperoxides are materials such as organic peroxides or organic peresters which decompose or hydrolyze to form organic hydroperoxides in situ: examples of such peroxides and peresters are cyclohexyl and hydroxycyclohexyl peroxide and t-butyl perbenzoate, respectively.

In an embodiment of the invention, the catalyst comprises or consists of at least one hydroperoxide compound represented by the formula:

$$R^pOOH$$

wherein: $R^p$ is a hydrocarbon group containing up to 18 carbon atoms, and preferably wherein: $R^p$ is a $C_1$-$C_{12}$ alkyl, $C_6$-$C_{18}$ aryl or $C_6$-$C_{18}$ aralkyl group.

As exemplary catalysts, which may be used alone or in combination, there may be mentioned: cumene hydroperoxide (CHP); para-menthane hydroperoxide; t-butyl hydroperoxide (TBH); t-butyl perbenzoate; t-amyl hydroperoxide; 1,2,3,4-tetramethylbutyl hydroperoxide; benzoyl peroxide; dibenzoyl peroxide; 1,3-bis(t-butylperoxyisopropyl) benzene; diacetyl peroxide; butyl 4,4-bis (t-butylperoxy) valerate; p-chlorobenzoyl peroxide; t-butyl cumyl peroxide; di-t-butyl peroxide; dicumyl peroxide; 2,5-dimethyl-2,5-di-t-butylperoxyhexane; 2,5-dimethyl-2,5-di-t-butyl-peroxyhex-3-yne; and, 4-methyl-2,2-di-t-butylperoxypentane.

iii) Accelerator

Component (A) of the composition of the present invention includes iii) at least one cure accelerator for said at least one cyanoacrylate monomer i). The composition should conventionally comprise from 0.01 to 10 wt. %, for example from 0.1 to 5 wt. % or from 0.1 to 3 wt. %, of iii) said at least one cure accelerator, based on the total weight of the composition. Such accelerators may be selected from: calixarenes and oxacalixarenes; silacrowns; crown ethers; cyclodextrins; polyethyleneglycol) di(meth)acrylates; ethoxylated hydric compounds; and, combinations thereof.

Of the calixarenes and oxacalixarenes, many are known and are reported in the patent literature. Instructive disclosures include: U.S. Pat. Nos. 4,556,700; 4,622,414; 4,636, 539; 4,695,615; 4,718,966; and, 4,855,461. And as regards calixarenes, those compounds within the structure below are useful herein:

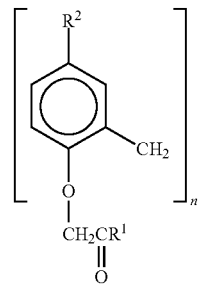

wherein: $R^1$ is alkyl, alkoxy, substituted alkyl or substituted alkoxy;
$R^2$ is H or alkyl; and,
n is 4, 6 or 8.

One particularly desirable calixarene is tetrabutyl tetra[2-ethoxy-2-oxoethoxy]calix-4-arene.

A multiplicity of suitable crown ethers is known. For instance, examples which may be used herein either individually or in combination include: 15-crown-5; 18-crown-6; dibenzo-18-crown-6; benzo-15-crown-5-dibenzo-24-crown-8; dibenzo-30-crown-10; tribenzo-18-crown-6; asym-dibenzo-22-crown-6; dibenzo-14-crown-4; dicyclohexyl-18-crown-6; dicyclohexyl-24-crown-8; cyclohexyl-12-crown-4; 1,2-decalyl-15-crown-5; 1,2-naphtho-15-crown-5; 3,4,5-naphtyl-16-crown-5; 1,2-methyl-benzo-18- crown-6; 1,2-methylbenzo-5; 6-methylbenzo-18-crown-6; 1,2-t-butyl-18-crown-6; 1,2-vinylbenzo-15-crown-5; 1,2-vinylbenzo-18-crown-6; 1,2-t-butyl-cyclohexyl-18-crown-6; asym-dibenzo-22-crown-6; and, 1,2-benzo-1,4-benzo-5-oxygen-20-crown-7. Reference may be made to U.S. Pat. No. 4,837,260 (Sato), the disclosure of which is expressly incorporated herein by reference.

Without intention to limit the present invention, useful silacrown compounds may be represented by the structure below:

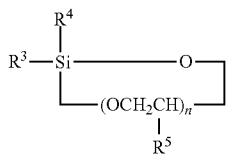

wherein: $R^3$ and $R^4$ are organo groups which do not themselves cause polymerization of the cyanoacrylate monomer;
$R^5$ is H or $CH_3$; and,
n is an integer of from 1 to 4.

Examples of suitable $R^3$ and $R^4$ groups are alkyl groups, alkoxy groups, such as methoxy and ethoxy groups, and aryloxy groups, such as the phenoxy groups. The $R^3$ and $R^4$ groups may contain halogen or other substituents, an example being trifluoropropyl. However, groups not suitable as $R^4$ and $R^5$ groups are basic groups, such as amino, substituted amino and alkylamino.

Specific examples of silacrown compounds useful in the inventive compositions include:

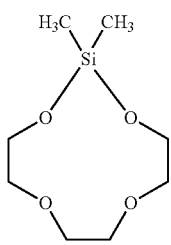

dimethylsila-11-crown-4;

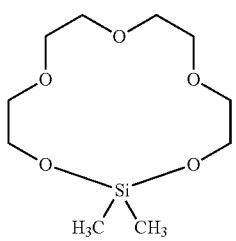 [SMILES: C[Si]1(C)OCCOCCOCCOCCO1]

dimethylsila-14-crown-5; and,

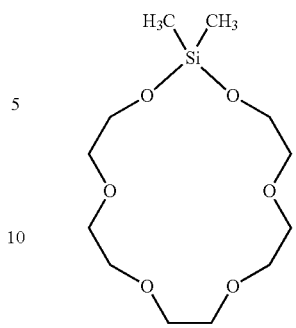

dimethylsila-17-crown-6.

Reference to the disclosure of U.S. Pat. No. 4,906,317 (Liu) may be instructive to the use of such silacrown ethers.

Many cyclodextrins may be used in connection with the present invention, for instance those described and claimed in U.S. Pat. No. 5,312,864 (Went), the disclosure of which is hereby expressly incorporated herein by reference: hydroxyl group derivatives of an α, β or γ-cyclodextrin which is at least partly soluble in the cyanoacrylate would be particularly appropriate choices for use herein as an accelerator component.

As mentioned herein above poly(ethylene glycol) di(meth)acrylates can have utility in the present invention. More particularly, exemplary poly(ethylene glycol) di(meth)acrylates for use herein possess the structure below:

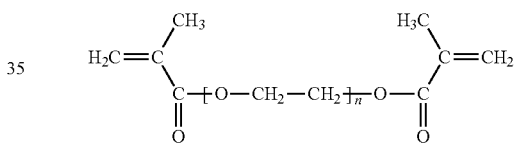

wherein: n is ≥3, for example from 3 to 30 or from 3 to 20.

As such, specific examples include but are not limited to: PEG 200 DMA (n≈4); PEG 400 DMA (n≈9); PEG 600 DMA (n≈14); and, PEG 800 DMA (n≈19), in which the assigned number (e.g., 400) represents the average molecular weight of the glycol portion of the molecule.

As mentioned herein above ethoxylated hydric compounds can have utility in the present invention. More particularly, exemplary ethoxylated hydric compounds for use herein possess the structure below:

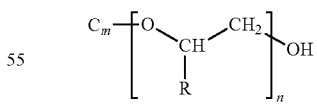

wherein: Cm can be a linear or branched alkyl or alkenyl chain;
m is an integer from 1 to 30, for example from 5 to 20;
n is an integer from 2 to 30, for example from 5 to 15; and,
R may be H or C1-C6 alkyl.

In addition, further suitable accelerators may be embraced within the structure below:

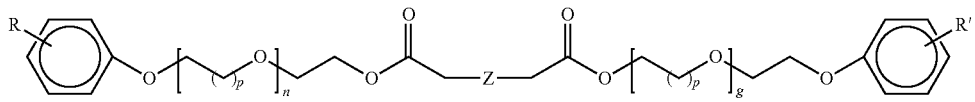

wherein: R and R' are independently selected from hydrogen, $C_{1-6}$ alkyl, $C_{1-6}$ alkyloxy, alkyl thioethers, haloalkyl, carboxylic acid and esters thereof, sulfinic, sulfonic and sulfurous acids and esters, phosphinic, phosphonic and phosphorous acids and esters thereof;
Z is a polyether linkage;
n is from 1 to 12;
p is from 1 to 3;
g is from 1 to 12 are as defined above, and R' is the same as R, and g is the same as n.

A particularly desirable chemical within this class is:

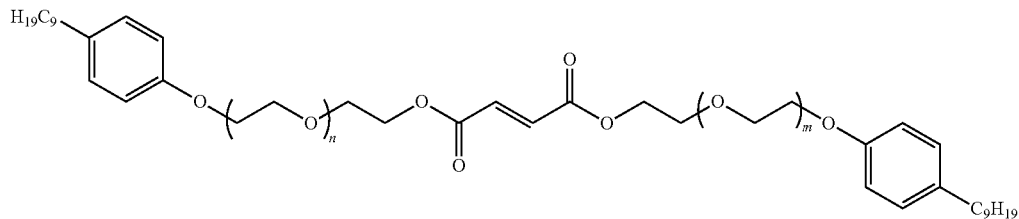

where (n+m) is ≥12.

iv) Stabilizer

Component (A) of the present invention should preferably include one or more stabilizers. "Stabilizers" for the purposes of this invention are to be understood as antioxidants, UV stabilizers, free-radical stabilizers, anionic stabilizers or hydrolysis stabilizers which inter alia have utility in inhibiting the decomposition of the peroxide present in the composition. Herein stabilizers may constitute up to 10 wt. % or up to 5 wt. %, based on the total weight of the Component (A).

Standard commercial examples of stabilizers suitable for use herein include: sterically hindered phenols; thioethers; benzotriazoles; benzophenones; benzoates; amines of the hindered amine light stabilizer (HALS) type; phosphorus; sulfur trioxide and hydrolysis products thereof; methane sulfonic acid; sulfur; boron trifluoride; boron trifluoride etherate; and, mixtures thereof. In particular embodiments, the stabilizer may be selected from the group consisting of benzoquinone, naphthoquinone, anthraquinone, hydroquinone, methoxyhydroquinone, butylated hydroxy toluene and mixtures thereof. The disclosures of U.S. Pat. Nos. 5,530, 037 and 6,607,632 may be instructive to the skilled artisan.

For completeness, it is noted that the statement of preference for the inclusion of stabilizers in Component (A) does not preclude stabilizers being included in Component (B). However, in toto the amount of stabilizers present in both components should not be greater than 10 wt. %, based on the total weight of the composition.

Component B i) Unsaturated Polyester

Component B of the present composition comprises at least one unsaturated polyester polymer containing at least two cycloolefinic double bonds (UPS). The unsaturated polyester (UPS) is desirably essentially free from styrene and should preferably be characterized by a weight average molecular weight (Mw) of at least 1000 daltons, for example from 2000 to 10000 daltons. It is further preferred that said polymer comprises $C_5$ to $C_8$ cyclic moieties; said moiety is not precluded from being present within a bicyclic structure such as that formed when cyclic structures contain a bridging hydrocarbon moiety to form two rings in the overall structure.

The composition should comprise from 40 to 95 wt. %, for example from 75 to 95 wt. %, based on the weight of component (B) of i) said at least one unsaturated polyester polymer (UPS). In an alternative but not mutually exclusive expression of preference, said composition should comprise from 20 to 50 wt. %, based on the weight of the composition of i) said at least one unsaturated polyester polymer (UPS).

Commercial examples of unsaturated polyesters (UPS) in accordance with this component include Palatal K 785 V 01, available from DSM Resins. In addition, such unsaturated polyesters (UPS) can be prepared through several different methods.

In a first exemplary method, the unsaturated polyester polymer (UPS) is obtained through a Diels-Alder reaction of the carbon-carbon double bonds on the polymer chain of an unsaturated polyester polymer (UP)—not having cycloolefinic double bonds but having at least two carbon-carbon double bonds—with a cyclohydrocarbon compound, such as cyclopentadiene, methyl cyclopentadiene, ethyl cyclopentadiene, isopropyl cyclopentadiene, 1,3-cyclohexadiene, 1-methyl-4-isopropylcyclohexa-1,3-diene, 2-methyl-5-isopropylcyclohexa-1,3-diene or mixtures thereof.

In this first method, the Diels-Alder reaction of the carbon-carbon double bonds and cyclohydrocarbon compound can occur at any point of the reaction by controlling the reaction temperature and the addition of a cyclohydrocarbon compound during the reaction. By way of preferred example, the unsaturated polyester polymer containing cycloolefinic double bonds is obtained by adding dicyclopentadiene into a reaction vessel at or near the end of the synthesis of the unsaturated polyester resin at temperature ≥150° C.: the dicyclopentadiene decomposes into cyclopentadiene and the cyclopentadiene then reacts with the carbon-carbon double bonds of the unsaturated polyester polymer.

The reactant unsaturated polyester polymer (UP) without the cycloolefinic double bonds has at least one dicarboxylic alkene moiety and is derivable by the condensation reaction of: a) at least one diol; b) at least one α,β-ethylenically unsaturated dicarboxylic acid or its ester forming derivative; and optionally, c) at least one dicarboxylic acid which does not contain any unsaturated aliphatic groups or its ester forming derivative.

Suitable diols (a) for use in this context include saturated and unsaturated aliphatic and cycloaliphatic dihydroxy compounds as well as aromatic dihydroxy compounds. These diols preferably have a molecular weight of 250 daltons or less. When used herein, the term "diol" should be construed to include equivalent ester forming derivatives thereof, provided, however, that the molecular weight requirement pertains to the diol only and not to its derivative. Exemplary ester forming derivatives include the acetates of the diols as well as, for example, ethylene oxide or ethylene carbonate for ethylene glycol.

Preferred diols are those having from 2 to 10 carbon atoms. As examples of these diols there might be mentioned: ethylene glycol; propylene glycol; 1,3-propane diol; 1,2-butane diol; 2-methyl propanediol; 1,3-butane diol; 1,4-butane diol; 2,3-butane diol; neopentyl glycol; hexanediol; decanediol; hexamethylene glycol; cyclohexane dimethanol; resorcinol; and, hydroquinone. Mixtures of such diols may be employed, but in this regard, it is generally preferred that at least about 60 mol. % and preferably at least 80 mol. %, based on the total diol content, be the same diol.

In a preferred embodiment, the diol is selected from: ethylene glycol; propylene glycol; 1,3-propane diol; 1,2-butane diol; 1,3-butane diol; 1,4-butane diol; 2,3-butane diol; neopentyl glycol; hexamethylene glycol; cyclohexane dimethanol; and, mixtures thereof. Most preferably, the diol is either ethylene glycol or neopentyl glycol.

The term "dicarboxylic acids" used hereinafter includes equivalents of dicarboxylic acids having two functional carboxyl groups which perform substantially like dicarboxylic acids in reaction with glycols and diols in forming polyesters. These equivalents include esters and ester forming reactive derivatives, such as acid halides and anhydrides, provided however that any stated molecular weight preference mentioned pertains to the acid and not to its equivalent ester or ester-forming derivatives. Specifically, it is preferred that all dicarboxylic acid monomers [(ii), (iii)] have molecular weight of less than 300 daltons. Thus, an ester of a dicarboxylic acid having a molecular weight greater than 300 daltons or an acid equivalent of a dicarboxylic acid having a molecular weight greater than 300 daltons are included provided the acid has a molecular weight below 300 daltons. Additionally, the dicarboxylic acids may contain any substituent groups(s) or combinations which do not substantially interfere with the polymer formation and use of the polymer of this invention.

Exemplary $\alpha,\beta$-ethylenically unsaturated dicarboxylic acids (b) have from 4 to 6 carbon atoms ($C_4$-$C_6$) and include: maleic acid; fumaric acid; citraconic acid; chloromaleic acid; allyl succinic acid; itaconic acid; and, mesaconic acid. A preference for maleic acid may be mentioned.

Said further dicarboxylic acids (c) which does not contain any unsaturated aliphatic groups and which are suitable for use in the above context include aliphatic, cycloaliphatic, and/or aromatic dicarboxylic acids. Preferred dicarboxylic acids are those selected from the group comprising alkyl dicarboxylic acids having a total of 2 to 16 carbons atoms and aryl dicarboxylic acids having a total of from 8 to 16 carbon atoms. Representative alkyl dicarboxylic acids include: glutaric acid; adipic acid; pimelic acid; succinic acid; sebacic acid; azelaic acid; and, malonic acid. A preference for adipic acid might be mentioned here. Representative aryl dicarboxylic acids include: terephthalic acid; phthalic acid; and, isophthalic acid.

The condensation reaction for forming the reactant polyester (UP) will occur under conditions for water removal which will typically be constituted by one or more of: a temperature of from 120° to 250° C.; the application of a vacuum; and, the use of solvents to facilitate azeotropic distillation. A conventional catalyst for the promotion of an esterification reaction can be employed in the reaction. Catalysts, which may be used in an amount of from 0.01 to 1 wt. %, for example from 0.01 to 0.5 wt. %, based on the combined weight of the reactants, will typically be compounds of tin, antimony, titanium or zirconium. Mention in this regard may be made of: titanium alkoxides and derivatives thereof, such as tetraethyl titanate, tetra isopropyl titanate (TIPT), tetra n-propyl titanate, tetra n-butyl titanate, tetra(2-ethylhexyl) titanate, isopropyl butyl titanate, tetrastearyl titanate, diisopropoxy-bis(acetylacetonato) titanium, di-n-butoxy-bis(triethanolaminoato) titanium, tributyl monoacetyltitanate triisopropyl monoacetyltitanate and tetrabenzoic acid titanate; titanium complex salts, such as alkali titanium oxalates and malonates, potassium hexafluorotitanate and titanium complexes with hydroxycarboxylic acids such as tartaric acid, citric acid or lactic acid; titanium dioxide/silicon dioxide co-precipitates; hydrated alkaline-containing titanium dioxide; and, the corresponding zirconium compounds.

In a second exemplary method for forming the unsaturated polyester (UPS) of this component, dicyclopentadiene (DCPD) may be directly included as a monomer in the synthesis of unsaturated polyester (UP) polymers from their constituent monomers [(a)-(c)], as described herein above. The production of such dicyclopentadiene-containing unsaturated polyester polymers is considered to be well-known to the skilled artisan. Reference may in any event be made to: Smith et al. *The Use of Dicyclopentadiene in Polyesters*, Proceedings of the 22nd Annual Technical Conference, S.P.I., Reinforced Plastics Division, Washington, D.C. (1967); and, Zimmermann et al. *Modification of Unsaturated Polyesters with Dicyclopentadiene* Qette-Serfen-Anstrichmittel 66, #9, 670-678 (1964).

In a third exemplary method, the unsaturated polyester (UPS) of this component is obtained by the direct reaction of the monomers [(a)-(c)] as described herein above with a norbornene compound containing either —OH or —$CO_2H$ reactive functional groups. Exemplary monomers for inclusion in the condensation reaction mixture include: 5-norbornene-2-carboxylic acid; 5-norbornene-2,3-dicarboxylic acid; 5-Norbornene-2,3-dicarboxylic anhydride diethyl 5-norbornene-2,3-dicarboxylate; dimethyl 5-norbornene-2,3-dicarboxylate; 5-norbornene-2,3-dicarboxylic anhydride; 5-norbornene-2,2-dimethanol; 5-norbornene-2,3-dimethanol; 5-norbornene-2-methanol; 5-norbornen-2-ol; and, 5-norbornen-2-yl acetate.

ii) Transition Metal Compound(s)

As defined herein above, Component (B) of the compositions of the present invention should include from 100 to 10000 ppm weight, for example from 100 to 5000 ppm weight, based on the weight of said component, of at least one transition metal compound. In particular, it is preferred said at least one transition metal compound is selected from copper, vanadium, cobalt and iron compounds.

A specific preference for Cu (I) and Cu (II) compounds may be noted and indeed effective results have been obtained where Component B comprises from 100 to 5000 ppm, for example from 500 to 2500 ppm, based on the weight of said Component, of the total of Cu (I) and Cu (II) compounds.

As a non-exhaustive list of suitable copper (I) and (II) compounds there may be mentioned: copper (II) 3,5-diisopropylsalicylate hydrate; copper bis(2,2,6,6-tetramethyl-3,5-heptanedionate); copper (II) hydroxide phosphate; copper (II) chloride; copper (II) acetate monohydrate; tetrakis(acetonitrile)copper (I) hexafluorophosphate; copper (II) formate hydrate; tetrakisacetonitrile copper (I) triflate; copper (II)tetrafluoroborate; copper (II) perchlorate; tetrakis (acetonitrile)copper (I) tetrafluoroborate; copper (II) hydroxide; copper (II) hexafluoroacetylacetonate hydrate; and, copper (II) carbonate.

With regard to vanadium compounds, those compounds where vanadium enjoys a 2+ and 3+ valence state are desirable. Examples of such vanadium (III) compounds include vanadyl naphthanate and vanadyl acetylacetonate. And, when present, these vanadium (III) compounds should be used in an amount up to 5000 ppm, for example from 500 ppm to 2500 ppm by weight, based on the weight of Component B.

As regards cobalt compounds, compounds where cobalt enjoys a 2+ valence state are desirable. Examples of such cobalt (II) compounds include cobalt naphthenate, cobalt tetrafluoroborate and cobalt acetylacetonate. And, when present, these cobalt (II) compounds should be used in an amount up to 5000 ppm, for example from 500 ppm to 2500 ppm by weight, based on the weight of Component B.

With regard to iron compounds, compounds where iron enjoys a 3+ valence state are desirable. Non-limiting examples of such iron (III) compounds are: iron acetate; iron acetylacetonate; iron tetrafluoroborate; iron perchlorate; and, iron chloride. When present, these iron (III) compounds should be used in an amount up to 1,000 ppm, for example from 100 ppm to 1000 ppm by weight, based on the weight of Component B.

iii) Hydrophobic Fumed Silica

Component B of the composition of the present invention preferably comprises from 1 to 5 wt. %, based on the weight of the composition, of hydrophobic fumed silica.

The utilized hydrophobic fumed silica should be characterized by at least one of: a) an average particle size, as determined by dynamic light scattering, of less than 5 microns; b) a specific surface area, as determined by Brunauer-Emmett-Teller (BET) of from 20 to 200 $m^2/g$; and, c) a tap density, as determined ASTM B527-15 Standard Test Method for Tap Density of Metal Powders and Compounds of from 20 to 100 g/l. More particularly, the fumed silica should be characterized by at least one of: a) an average particle size of from 1 to 10 microns; b) a specific surface area of from 100 to 250 $m^2/g$; and, c) a tap density of from 25 to 75 g/l. And, for completeness, it is noted that these conditions a) to c) are not mutually exclusive and the fumed silica may meet one, two or desirably three of said conditions.

Additives and Adjunct Ingredients

Said compositions obtained in the present invention will typically further comprise adjuvants and additives that can impart improved properties to these compositions. Included among such adjuvants and additives—which independently of one another may be included in single components or both components of a two (2K) component composition—are: photoinitiators; photosensitizers; plasticizers; stabilizers including UV stabilizers; sequestrants; antioxidants; coupling agents; adhesion promoters; rheological adjuvants; fillers; toughening agents; reactive diluents; drying agents; fungicides; flame retardants; corrosion inhibitors; fluorescence markers; pigments; and/or, non-reactive diluents.

Such adjuvants and additives can be used in such combination and proportions as desired, provided they do not adversely affect the nature and essential properties of the composition. While exceptions may exist in some cases, these adjuvants and additives should not in toto comprise more than 50 wt. % of the total composition and preferably should not comprise more than 20 wt. % of the composition.

For completeness, it is noted that in general adjunct materials and additives which contain reactive groups will be blended into the appropriate component of the two (2K) component composition to ensure the storage stability thereof. Unreactive materials may be formulated into either or both of the two components.

As noted above, component (B) of the present invention includes a compound possessing a free-radically active, unsaturated group. It may, in certain embodiments, be advantageous for Component (A) to include, in addition to the peroxide compounds, one or more photoinitiator compounds which, specifically, would be photoactive compounds that generate free radicals under applied irradiation that can initiate polymerization by addition to the C=C double bonds.

Photoinitiators for use in these embodiments should be selected from Norrish type I and Norrish type II photoinitiators. A Norrish type I radical photoinitiator undergoes the Norrish type I reaction when exposed to actinic radiation: said reaction is defined by IUPAC as α-cleavage of an excited carbonyl compound leading to an acyl-alkyl radical pair (from an acyclic carbonyl compound) or an acyl-alkyl biradical (from a cyclic carbonyl compound) as a primary photoproduct. A Norrish type II radical photoinitiator undergoes the Norrish type II reaction when exposed to actinic radiation: that reaction is defined by IUPAC as the photochemical abstraction of a γ-hydrogen by an excited carbonyl compound to produce a 1,4-biradical as a primary photoproduct.

Non-limiting examples of photoactive compounds that undergo a Norrish I cleavage include but are not limited to: 2-methyl-I[4-(methylthio)phenyl]-2-rnorpholinopropan-1-one (Irgacure 907, available from BASF); 2-benzyl-2-dimethylamino-I-(4-morpholinophenyl)-butanone-1 (Irgacure 369); and, 2-(dimethylamino)-2-[(4-methylphenyl)methyl]-1-[4-(4-morpholinyl)phenyl]-1-butanone (Irgacure 379). Non limiting examples of photoactive compounds that undergo a Norrish II reaction include but are not limited to: bis(2,6-dimethylbenzoyl)-2,4,4-trimethylpentylphosphine oxide (Irgacure 1800, 1850, and 1700); 2,4,6-trimethylbenzoyl-diphenylphosphine oxide (Lucerin TPO, available from BASF); ethyl (2,4,6-trimethylbenzoyl)-phenylphosphinate (Lucerin TPO-L); bis(2,4,6-trimethylbenzoyl)-phenylphosphine oxide; isopropyl thioxanthone; diethyl thioxanthone; and, 2-chlorothioxanthone. It is noted that Norrish Type II photoinitiators often require the presence of a suitable co-initiator—typically an amine, such as 2-dimethylaminoethylbenzoate—and for this reason a preference for Norrish type I photoinitiators may be acknowledged.

In toto photoinitiator should be present in the photocurable composition in amount of from 0 to 5 wt. %, for example from 0 to 2.0 wt. % or from 0 to 1.5 wt. %, based on the total weight of the composition.

As would be recognized by the skilled artisan, photosensitizers can be incorporated into the compositions to improve the efficiency with which the photoinitiator uses the energy delivered. The term "photosensitizer" is used in accordance with its standard meaning to represent any substance that either increases the rate of photoinitiated polymerization or shifts the wavelength at which polymerization occurs: Odian, *Principles of Polymerization* 3rd Edition (1991), Page 222 provides an instructive reference in this regard. When present, photosensitizers should be used in an amount of from 5 to 25 wt. %, based on the weight of the photoinitiator.

The use of photoinitiator(s)—and where applicable photosensitizer(s)—may produce residue compounds from the photochemical reaction in the final cured product. The residues may be detected by conventional analytical techniques such as: infrared, ultraviolet and NMR spectroscopy; gas or liquid chromatography; and, mass spectroscopy. Thus, the present invention may comprise cured matrix (co-)polymers and detectable amounts of residues from at least the photoinitiator. Such residues are present in small amounts and do not normally interfere with the desired physiochemical properties of the final cured product.

A "plasticizer" for the purposes of this invention is a substance that decreases the viscosity of the composition and thus facilitates its processability. Herein the plasticizer may constitute up to 10 wt. % or up to 5 wt. %, based on the total weight of the composition, and is preferably selected from the group consisting of: polydimethylsiloxanes (PDMS); diurethanes; ethers of monofunctional, linear or branched C4-C16 alcohols, such as Cetiol OE (obtainable from Cognis Deutschland GmbH, Düsseldorf); esters of abietic acid, butyric acid, thiobutyric acid, acetic acid, propionic acid esters and citric acid; esters based on nitrocellulose and polyvinyl acetate; fatty acid esters; dicarboxylic acid esters; esters of OH-group-carrying or epoxidized fatty acids; glycolic acid esters; benzoic acid esters; phosphoric acid esters; sulfonic acid esters; trimellitic acid esters; epoxidized plasticizers; polyether plasticizers, such as endcapped polyethylene or polypropylene glycols; polystyrene; hydrocarbon plasticizers; chlorinated paraffin; and, mixtures thereof. It is noted that, in principle, phthalic acid esters can be used as the plasticizer but these are not preferred due to their toxicological potential. It is preferred that the plasticizer comprises or consists of one or more polydimethylsiloxane (PDMS).

As suitable adhesion promoters there may be mentioned: (meth)acrylic acid; Ebecryl 168, methacrylated acidic adhesion promoter commercially available from Radcure Corporation; Ebecryl 170, acrylated acidic adhesion promoter commercially available from Radcure Corporation; β-carboxyacrylate; Sartomer CN 704, acrylated polyester adhesion promoter available from Sartomer Corporation; and, CD9050, monofunctional acid ester CD 9052, available from Sartomer Corporation; CD 9052, trifunctional acid ester commercially available from Sartomer Corporation; and, zinc diacrylate.

Those compositions of the present invention may optionally contain a toughening rubber which is desirably present in the form of a rubber-modified epoxy resin, in the form of core-shell particles or a combination thereof. The toughening rubber should have a glass transition temperature ($T_g$) of no greater than −25° C.: preferably at least a portion of the toughening rubber should have a glass transition temperature ($T_g$) of −40° C. or lower, more preferably −50° C. or lower and even more preferably −70° C. or lower.

Independently of the presence of the rheology modifier and in particular hydrophobic fumed silica in the composition, it is envisaged that the compositions according to the present invention can additionally contain fillers. Suitable here are, for example, chalk, lime powder, precipitated silicic acid, zeolites, bentonites, magnesium carbonate, diatomite, alumina, clay, talc, titanium oxide, iron oxide, zinc oxide, sand, quartz, flint, mica, glass powder, and other ground mineral substances. Organic fillers can also be used, in particular carbon black, graphite, wood fibers, wood flour, sawdust, cellulose, cotton, pulp, cotton, wood chips, chopped straw, chaff, ground walnut shells, and other chopped fibers. Short fibers such as glass fibers, glass filament, polyacrylonitrile, carbon fibers, Kevlar fibers, polyethylene fibers, polyethylene powder and particulate polytetrafluroethylene can also be added.

Also suitable as fillers are hollow spheres having a mineral shell or a plastic shell. These can be, for example, hollow glass spheres that are obtainable commercially under the trade name Glass Bubbles®. Plastic-based hollow spheres, such as Expancel® or Dualite®, may be used and are described in EP 0 520 426 B1: they are made up of inorganic or organic substances and each have a diameter of 1 mm or less, preferably 500 μm or less.

Fillers which impart thixotropy to the composition may be preferred for many applications: such fillers are also described as rheological adjuvants, e.g. hydrogenated castor oil, fatty acid amides, or swellable plastics such as PVC.

The total amount of fillers present in the compositions of the present invention will preferably be from 1 to 15 wt. %, and more preferably from 1 to 10 wt. %, based on the total weight of the composition. The desired viscosity of the curable composition will typically be determinative of the total amount of filler added.

In order to enhance shelf life even further, it is often advisable to further stabilize the compositions of the present invention with respect to moisture penetration through using drying agents.

The presence of reactive diluents in the composition is not precluded and indeed may be beneficial to modify the properties of the cured adhesive. Reactant diluents, which may be used alone or in combination, include but are not limited to: α,β-ethylenically unsaturated monocarboxylic acids containing 3 to 5 carbon atoms such as acrylic acid, methacrylic acid, crotonic acid and the esters of those acids; α,β-ethylenically unsaturated dicarboxylic acids containing 4 to 6 carbon atoms and the anhydrides, monoesters, and diesters of those acids; vinyl esters; vinyl ethers; vinyl ketones; and, aromatic or heterocyclic aliphatic vinyl compounds.

Representative examples of suitable esters of acrylic, methacrylic, and crotonic acids include, without limitation, those esters from reaction with saturated aliphatic and cycloaliphatic alcohols having 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates; hydroxyethyl acrylate, hydroxyethyl methacrylate, hydroxypropyl acrylate, hydroxypropyl methacrylate, hydroxybutyl acrylate, and hydroxybutyl methacrylate; and, polyalkylene glycol acrylates and methacrylates. Representative examples of other ethylenically unsaturated polymerizable monomers include, without limitation, such compounds as fumaric, maleic, and itaconic anhydrides, monoesters and diesters with alcohols such as methanol, ethanol, propanol, isopropanol, butanol, isobutanol, and tert-butanol. Representative examples of vinyl monomers include, without limitation, such compounds as: vinyl acetate; vinyl propionate; vinyl ethers, such as vinyl ethyl ether; vinyl and vinylidene halides; and, vinyl ethyl ketone. Representative examples of aromatic or heterocyclic aliphatic vinyl compounds include, without limitation, such compounds as styrene, α-methyl styrene, vinyl toluene, tert-butyl styrene, and 2-vinyl pyrrolidone.

Said reactive diluents may constitute from 0 to 10 wt. %, for example from 0 to 5 wt. % of the total weight of the composition.

The presence of non-reactive diluents in the compositions of the present invention is also not precluded where this can usefully moderate the viscosities thereof. For instance, but for illustration only, the compositions may contain one or more of: xylene; 2-methoxyethanol; dimethoxyethanol; 2-ethoxyethanol; 2-propoxyethanol; 2-isopropoxyethanol; 2-butoxyethanol; 2-phenoxyethanol; 2-benzyloxyethanol; benzyl alcohol; ethylene glycol; ethylene glycol dimethyl ether; ethylene glycol diethyl ether; ethylene glycol dibutyl ether; ethylene glycol diphenyl ether; diethylene glycol; diethylene glycol-monomethyl ether; diethylene glycol-monoethyl ether; diethylene glycol-mono-n-butyl ether; diethylene glycol dimethyl ether; diethylene glycol diethyl ether; diethylene glycoldi-n-butylyl ether; propylene glycol butyl ether; propylene glycol phenyl ether; dipropylene glycol; dipropylene glycol monomethyl ether; dipropylene glycol dimethyl ether; dipropylene glycoldi-n-butyl ether; N-methylpyrrolidone; diphenylmethane; diisopropylnaphthalene; petroleum fractions such as Solvesso® products (available from Exxon); alkylphenols, such as tert-butylphenol, nonylphenol, dodecylphenol and 8,11,14-pentadecatrienylphenol; styrenated phenol; bisphenols; aromatic hydrocarbon resins especially those containing phenol groups, such as ethoxylated or propoxylated phenols; adipates; sebacates; phthalates; benzoates; organic phosphoric or sulfonic acid esters; and sulfonamides.

The above aside, it is preferred that said non-reactive diluents constitute less than 10 wt %, in particular less than 5 wt. % or less than 2 wt %, based on the total weight of the composition.

Illustrative Embodiment of the Two-Component (2K) Composition

In an exemplary embodiment of the present invention, the two component (2K) composition comprises:
(A) a first component comprising:
from 90 to 99 wt. % wt. %, based on the weight of component (A), of
i) said at least one cyanoacrylate monomer represented by Formula 1:

wherein: R is selected from $C_1$-$C_{12}$ alkyl, $C_3$-$C_{12}$ cycloalkyl and $C_3$-$C_{12}$ allyl;
from 0.1 to 10 wt. %, based on the total weight of the composition, of ii) peroxide catalyst; and,
from 0.01 to 10 wt. %, based on the total weight of the composition, of iii) at least one cure accelerator for said at least one cyanoacrylate monomer i);
(B) a second component comprising:
from 40 to 95 wt. %, based on the weight of component (B), of i) at least one free radically curable, unsaturated polyester polymer (UPS), wherein said unsaturated polyester (UPS) comprises $C_5$ to $C_8$ cyclic moieties, is essentially free from styrene and has a weight average molecular weight (Mw) of from 1000 to 10000 daltons;
from 100 to 10000 ppm weight, based on the weight of component (B), of ii) at least one transition metal compound selected from the group consisting of: copper compound; vanadium compounds; cobalt compounds; and, iron compounds; and,
from 1 to 5 wt. %, based on the weight of the composition, of hydrophobic fumed silica,
wherein, when said components are mixed together, the peroxide catalyst initiates cure of said free radically curable compound(s) and the transition metal compound(s) initiates cure of the cyanoacrylate monomer(s).

Methods and Applications

To form the defined two component (2K) curable compositions, the reactive components are brought together and mixed in such a manner as to induce the hardening thereof. The reactive compounds should be mixed under sufficient shear forces to yield a homogeneous mixture. It is considered that this can be achieved without special conditions or special equipment. That said, suitable mixing devices might include: static mixing devices; magnetic stir bar apparatuses; wire whisk devices; augers; batch mixers; planetary mixers; C. W. Brabender or Banburry® style mixers; and, high shear mixers, such as blade-style blenders and rotary impellers.

For small-scale applications in which volumes of less than 2 liters will generally be used, the preferred packaging for the two component (2K) compositions will be side-by-side double cartridges or coaxial cartridges, in which two tubular chambers—typically of equal volume—are arranged alongside one another or inside one another and are sealed with pistons: the driving of these pistons allows the components to be extruded from the cartridge, advantageously through a closely mounted static or dynamic mixer. For larger volume applications, the two components of the composition may advantageously be stored in drums or pails: in this case the two components are extruded via hydraulic presses, in particular by way of follower plates, and are supplied via pipelines to a mixing apparatus which can ensure fine and highly homogeneous mixing of the two components. In any event, for any package it is important that the components be disposed with an airtight and moisture-tight seal, so that both components can be stored for a long time, ideally for 12 months or longer.

Non-limiting examples of two component dispensing apparatuses and methods that may be suitable for the present invention include those described in U.S. Pat. Nos. 6,129,244 and 8,313,006.

Depending upon the desired properties of the cured composition, the two components will conventionally be mixed at a ratio by volume of Component A:Component B of from 5:1 to 1:5, for example from 2:1 to 1:2 or from 1.5:1 to 1:1.5. The latter range includes a ratio by volume of Component A:Component B of from 1:1 which, in itself, presents a preferred embodiment of the present invention.

Where applicable, two (2K) component curable compositions should broadly be formulated to exhibit an initial viscosity—determined immediately after mixing, for example, up to two minutes after mixing—of less than 200000 mPa·s, for instance less than 100000 mPa·s, at 25° C. Independently of or additional to said viscosity characteristics, the two (2K) component composition should be formulated to be bubble (foam) free upon mixing and subsequent curing. Moreover, the two component (2K) composition should further be formulated to demonstrate at least one of the following properties: i) a maximum exotherm temperature of no greater than 120° C., preferably no greater than 100° C. and more preferably no greater than 80° C.; and, ii) a Shore A hardness of at least 50, preferably at 60 and more preferably at least 70 after being cured and stored for 7 days at room temperature and 50% relative humidity.

In accordance with the broadest process aspects of the present invention, the above described compositions are applied to a substrate and then cured in situ. Prior to applying the compositions, it is often advisable to pre-treat the relevant surfaces to remove foreign matter there from: this step can, if applicable, facilitate the subsequent adhesion of the compositions thereto. Such treatments are known in the art and can be performed in a single or multi-stage manner constituted by, for instance, the use of one or more of: an etching treatment with an acid suitable for the substrate and optionally an oxidizing agent; sonication; plasma treatment, including chemical plasma treatment, corona treatment, atmospheric plasma treatment and flame plasma treatment; immersion in a waterborne alkaline degreasing bath; treatment with a waterborne cleaning emulsion; treatment with a cleaning solvent, such as carbon tetrachloride or trichloroethylene; and, water rinsing, preferably with deionized or demineralized water. In those instances where a waterborne alkaline degreasing bath is used, any of the degreasing agent remaining on the surface should desirably be removed by rinsing the substrate surface with deionized or demineralized water.

In some embodiments, the adhesion of the coating compositions of the present invention to the preferably pretreated substrate may be facilitated by the application of a primer thereto. Indeed primer compositions may be necessary to ensure efficacious fixture and/or cure times of the adhesive compositions on inactive substrates. Whilst the skilled artisan will be able to select an appropriate primer, instructive references for the choice of primer include but are not limited to: U.S. Pat. Nos. 3,855,040; 4,731,146; 4,990,281; 5,811,473; GB 2502554; and, U.S. Pat. No. 6,852,193.

The compositions are then applied to the preferably pre-treated, optionally primed surfaces of the substrate by conventional application methods such as: brushing; roll coating using, for example, a 4-application roll equipment where the composition is solvent-free or a 2-application roll equipment for solvent-containing compositions; doctor-blade application; printing methods; and, spraying methods, including but not limited to air-atomized spray, air-assisted spray, airless spray and high-volume low-pressure spray. For coating, adhesive and sealant applications, it is recommended that the compositions be applied to a wet film thickness of from 10 to 500 μm. The application of thinner layers within this range is more economical and provides for a reduced likelihood of deleterious thick cured regions. However, great control must be exercised in applying thinner coatings or layers so as to avoid the formation of discontinuous cured films.

The curing of the compositions of the invention typically occurs at temperatures in the range of from −10° C. to 175° C., preferably from 0° C. to 160° C., and in particular from 20° C. to 160° C. The temperature that is suitable depends on the specific compounds present and the desired curing rate and can be determined in the individual case by the skilled artisan, using simple preliminary tests if necessary. Of course, curing at temperatures of from 10° C. to 35° C. or from 20° C. to 30° C. is especially advantageous as it obviates the requirement to substantially heat or cool the mixture from the usually prevailing ambient temperature. Where applicable, however, the temperature of the mixture formed from the respective components of a two (2K) component composition may be raised above the mixing temperature and/or the application temperature using conventional means including microwave induction.

The following examples are illustrative of the present invention and are not intended to limit the scope of the invention in any way.

EXAMPLES

The following materials were employed in the Examples:
Ethyl CA: Ethyl cyanoacrylate available from Sigma Aldrich.
HPMA: 2-hydroxypropyl methacrylate, available from Sigma Aldrich. Stock Solution 100: Boron trifluoride (diluted in ethyl cyanoacrylate monomer)
Stock Solution 127: Sulfur dioxide (diluted in ethyl cyanoacrylate monomer)
Levapren 900: Ethylene-vinyl acetate copolymer, available from Lanxess Deutschland GmbH.
Palatal® K 785 V-01: Unsaturated polyester resin based on dicyclopentadiene (DCPD) and having a viscosity of 235 mPa·s, available from DSM Resins.
Kayamer PM2: Bis(2-methacryloyloxyethyl) hydrogen phosphate, available from Nippon Kayaku.
TS720: Hydrophobic fumed silica, available from Cabot Corporation.

Example 1

Components A and B were prepared by mixing the ingredients in accordance with Table 1 herein below:

TABLE 1

| Ingredient | wt. % |
|---|---|
| Component (A) | |
| Ethyl CA Monomer | 68.90 |
| Stock solution 100 | 2.60 |
| Stock solution 127 | 1.00 |
| Levapren 900 | 22.50 |
| Tert-butyl peroxybenzoate | 5.00 |
| | 100.000 |
| Component (B) | |
| Palatal ® K 785 V-01 | 91.48 |
| PM2 | 0.02 |
| Cu+ | 0.50 |
| TS 720 | 8.00 |
| | 100.000 |

The components were loaded in an equal amount by weight into separate compartments of a 50 g cartridge and sealed at both ends. The cartridge was then loaded into a cartridge-gun and a mixing tip was installed on the front end. By application of constant pressure on the trigger, the two components were pushed into the mixing tip to ensure sufficient mixing before application to the stated substrate. The substrates were abraded aluminium and rigid plastics of GMBS each with a thickness of 0.1 inch. Substrates were cut into 2.5 cm×10 cm (1"×4") in size for tensile testing.

Tensile lap shear (TLS) test was performed at room temperature based upon ASTM D3163-01 *Standard Test Method for Determining Strength of Adhesively Bonded Rigid Plastic Lap-Shear Joints in Shear by Tension Loading*. The bond overlapping area was 2.5 cm×2.5 cm (1"×1") with a bond thickness of 0.1 cm (40 mil). Cohesive strength of the composition was measured using a creep test on a single bead of adhesive. The bead is applied to a plate at 0.53 g/m. The plate contains a slit cut transverse to the direction in which the bead is applied. Each slit is 0.3 cm wide and extends to one side of the plate. The bead of adhesive is applied to the plate and bridges over the slit, such that it does not droop into the slit itself. The plate is then placed in an oven at 105° F. and allowed to equilibrate for 20 min. A 40 g weight attached to a paper clip (Size No. 1) is then hung on the bead of adhesive in the section over the slit using the other end of the paper clip. The time required for the adhesive bead to break is termed the Bead Time.

By fixture time (set time) is meant the shortest time required by an adhesive to develop handling strength such that test specimens can be removed from fixtures, unclamped or handled without stressing the bond, thereby affecting bond strength. Herein fixture time is measured in accordance with ASTM D 1144-99. The results of these performance tests are given in Table 2 herein below.

TABLE 2

| Performance Test | Results |
|---|---|
| Bead Time, min | 8-9 |
| Fixture time, min | 14-16 |
| TLS, 40° C./24 hrs., GBMS | 13.0 |
| TLS, 40° C./24 hrs., Abraded AL (Ab. AL) | 9.0 |

The strength properties are also measured by tensile lap shear on samples that have been cured and conditioned for 250 hours at 150° C. days. The heat aging test results are given in Table 3 below.

TABLE 3

Heat Aging

| Heat aging Performance Result | Initial Lap shear strength | Results |
|---|---|---|
| TLS, GBMS, 150° C. @250 hrs. | 13.00 | 12.70 |
| TLS, Ab. Al, 150° C. @250 hrs. | 9.00 | 13.00 |

The results show the benefits of the included polyester: strength is retained even after heat aging.

Example 2

This Example investigates the inclusion of an acrylate monomer in Component (B). In this context, components (A) and (B) were prepared by mixing the ingredients in accordance with Table 4 herein below:

TABLE 4

| Ingredient | wt. % |
|---|---|
| Component (A) | |
| Ethyl CA Monomer | 68.90 |
| Stock solution 100 | 2.60 |
| Stock solution 127 | 1.00 |
| Levapren 900 | 22.50 |
| Tert-butyl peroxybenzoate | 5.00 |
| | 100.000 |
| Component (B) | |
| HPMA | 25.00 |
| Palatal ® K 785 V-01 | 66.48 |
| PM2 | 0.02 |
| Cu+ | 0.50 |
| TS 720 | 8.00 |
| | 100.000 |

The components were loaded in an equal amount by weight into separate compartments of a 50 g cartridge and sealed at both ends. The cartridge was then loaded into a cartridge-gun and a mixing tip was installed on the front end. By application of constant pressure on the trigger, the two components were pushed into the mixing tip to ensure sufficient mixing before application to the stated substrate. The substrates were abraded aluminium and rigid plastics of GMBS each with a thickness of 0.1 inch. Substrates were cut into 2.5 cm×10 cm (1"×4") in size for tensile test.

The results of the aforementioned performance tests are given in Table 5 herein below.

TABLE 5

| Performance Test | 1 | 2 | 3 | 4 |
|---|---|---|---|---|
| Bead Time, min | 7-8 | 6-7 | 6-7 | 5-6 |
| Fixture time, min | 13-15 | 13-15 | 13-15 | 13-15 |
| TLS, 40° C./24 hrs., GBMS | 17.8 | 18.4 | 20.6 | 21.0 |
| TLS, 40° C./24 hrs., Ab. AL | 12.0 | 13.0 | 12.5 | 12.0 |

In view of the foregoing description and examples, it will be apparent to those skilled in the art that equivalent modifications thereof can be made without departing from the scope of the claims.

What is claimed:

1. A two-component (2K) curable composition comprising:
   (A) a first component comprising:
      i) at least one cyanoacrylate monomer represented by Formula 1:

$$H_2C=C(CN)-COOR \quad (1)$$

wherein: R is selected from $C_1$-$C_{18}$ alkyl, $C_3$-$C_{18}$ cycloalkyl, $C_2$-$C_{15}$ alkenyl, $C_6$-$C_{18}$ aryl, $C_7$-$C_{15}$ aralkyl and $C_3$-$C_{15}$ allyl; and,
      ii) peroxide catalyst; and,
      iii) at least one cure accelerator for said at least one cyanoacrylate monomer of (A)i);
   (B) a second component comprising:
      i) at least one free radically curable compound; and,
      ii) at least one transition metal compound,
   wherein, when said first and second components are mixed together, the peroxide catalyst initiates cure of said free radically curable compound and the transition metal compound(s) initiates cure of the cyanoacrylate monomer, and
   wherein said at least one free radically curable compound comprises at least one unsaturated polyester polymer containing at least two cycloolefinic double bonds (UPS).

2. The two-component (2K) curable composition according to claim 1, wherein R in Formula 1 is selected from $C_1$-$C_{12}$ alkyl, $C_3$-$C_{12}$ cycloalkyl and $C_3$-$C_{12}$ allyl.

3. The two-component (2K) curable composition according to claim 1 comprising from 50 to 99.98 wt. %, based on the weight of component (A), of i) said at least one cyanoacrylate monomer.

4. The two-component (2K) curable composition according to claim 1, wherein said peroxide catalysts comprises or consists of at least one hydroperoxide compound represented by the formula:

$$R^pOOH$$

wherein: $R^p$ is a $C_1$-$C_{12}$ alkyl, $C_6$-$C_{18}$ aryl or $C_6$-$C_{18}$ aralkyl group.

5. The two-component (2K) curable composition according to claim 1, wherein said peroxide catalyst is selected from the group consisting of: cumene hydroperoxide (CHP); para-menthane hydroperoxide; t-butyl hydroperoxide (TBH); t-butyl perbenzoate; t-amyl hydroperoxide; 1,2,3,4-tetramethylbutyl hydroperoxide; benzoyl peroxide; dibenzoyl peroxide; 1,3-bis(t-butylperoxyisopropyl) benzene; diacetyl peroxide; butyl 4,4-bis (t-butylperoxy) valerate; p-chlorobenzoyl peroxide; t-butyl cumyl peroxide; di-t- butyl peroxide; dicumyl peroxide; 2,5-dimethyl-2,5-di-t-butylperoxyhexane; 2,5-dimethyl-2,5-di-t-butyl-peroxyhex-3-yne; 4-methyl-2,2-di-t-butylperoxypentane; and, mixtures thereof.

6. The two-component (2K) curable composition according to claim 5, wherein said peroxide catalyst is t-butyl perbenzoate.

7. The two-component (2K) curable composition according to claim 1 comprising from 0.1 to 10 wt. % of ii) said peroxide catalyst, based on the total weight of the composition.

8. The two-component (2K) curable composition according to claim 1, wherein said cure accelerator is selected from the group consisting of: calixarenes; oxacalixarenes; silacrowns; crown ethers; cyclodextrins; poly(ethyleneglycol) di(meth)acrylates; ethoxylated hydric compounds; and, combinations thereof.

9. The two-component (2K) curable composition according to claim 1 comprising from 0.01 to 10 wt. % of iii) said at least one cure accelerator, based on the total weight of the composition.

10. The two-component (2K) curable composition according to claim 1, wherein said unsaturated polyester (UPS) is essentially free from styrene and is characterized by a weight average molecular weight (Mw) of from 1000 to 10000 daltons.

11. The two-component (2K) curable composition according to claim 10, wherein said unsaturated polyester (UPS) comprises $C_5$ to $C_8$ cyclic moieties.

12. The two-component (2K) curable composition according to claim 1 comprising from 40 to 95 wt. %, based on the weight of component (B), of i) said at least one unsaturated polyester polymer (UPS).

13. The two-component (2K) curable composition according to claim 1, wherein said at least one transition metal compound is selected from the group consisting of: copper compounds; vanadium compounds; cobalt compounds; and, iron compounds.

14. The two-component (2K) curable composition according to claim 1, wherein component (B) comprises from 100 to 10000 ppm weight, based on the weight of said component, of ii) said at least one transition metal compound.

15. The two-component (2K) curable composition according to claim 1, wherein component (B) further comprises from 1 to 5 wt. %, based on the weight of the composition, of hydrophobic fumed silica.

16. A cured product obtained from the two-component (2K) composition as defined in claim 1.

17. The two-component (2K) curable composition according to claim 1, wherein the at least one free radical curable compound of component (B) consists of a UPS essentially free from styrene, characterized by a weight average molecular weight (Mw) of from 1000 to 10000 daltons and having $C_5$ to $C_8$ cyclic moieties.

* * * * *